UNITED STATES PATENT OFFICE.

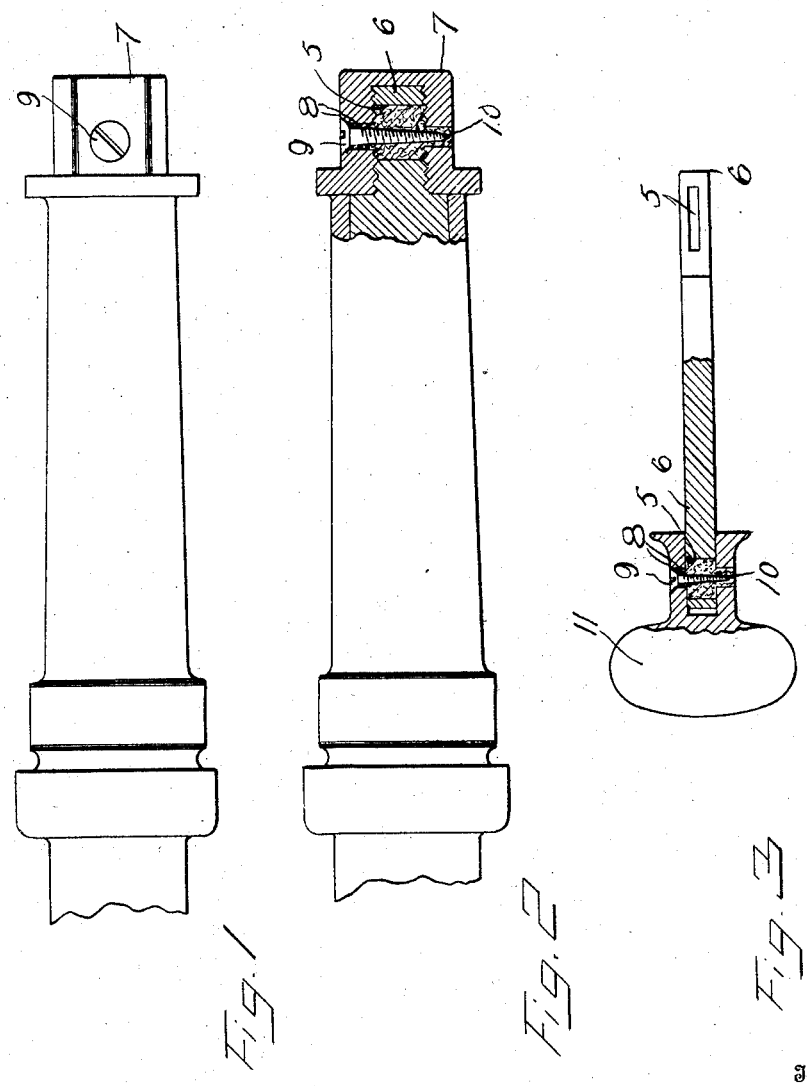

GEORGE W. STUART, OF NEWTOWN, CONNECTICUT.

NUT-LOCK.

No. 909,035.　　Specification of Letters Patent.　　Patented Jan. 5, 1909.

Application filed March 27, 1908. Serial No. 423,600.

*To all whom it may concern:*

Be it known that I, GEORGE W. STUART, a citizen of the United States, residing at Newtown, in the county of Fairfield, State of Connecticut, have invented certain new and useful Improvements in Nut-Locks; and I do hereby declare the following to be a full, clear, and exact description of the invention, such as will enable others skilled in the art to which it appertains to make and use the same.

This invention has relation to nut locks generally, and particularly to that kind or class of nut locks that are designed to secure nuts on spindles, as for instance, the nuts on the spindles of wagon axles or nuts on the spindles of door-knobs.

It is the object of the invention to provide a nut lock that shall be efficient, simple in construction, and capable of application to existing structures as well as to new means that may be organized in the making for the application of the improvement.

The invention consists of a spindle, bolt or cognate device, adapted to have a nut turned thereon and having a hole or aperture formed transversely therethrough and a nut also having a hole formed transversely through it and each having sound, tough leather, or material similar to leather, filled into said holes and a screw or screws turned into said leather and extending through the said aperture, all as will be fully understood by those skilled in the art, in view of the annexed drawings, forming a part of this specification.

This invention will first be described in detail in connection with the said drawings, and then be pointed out with particularity in the subjoined claims.

Of the said drawings:—Figure 1 shows, in side elevation, the spindle of a vehicle axle provided with my improvements. Fig. 2 is a longitudinal sectional view of the same. Fig. 3 is a sectional view of a door spindle and knob equipped with my improvements.

Similar figures of reference designate similar parts or features, as the case may be, wherever they occur.

In the form of the device shown in Fig. 3 there is provided a door knob 11 arranged to fit over the spindle 6, the remainder of the members being substantially the same as those shown in Figs. 1 and 2 with the exception that in this form there is no threaded end or threaded recess but the knob is held upon the spindle by the frictional resistance of the leather in the slots and the screw 9. The knob can thus be positioned accurately in desired relation to the spindle.

I have instanced a vehicle axle and the spindle of a door-knob as means to which my invention may be applied, merely because the said means are devices with which the public is universally familiar, and not because of any limitation in the use of the invention.

In the form of the device shown in Figs. 1 and 2, I form an aperture 5 of any desired size and shape through the externally screw-threaded part or device 6, that is adapted to receive an internally screw-threaded nut 7 thereon, and also make an aperture 8 transversely through the nut, so that at some point in turning up the nut the apertures in the two separate parts or members will be brought into registering position. The two apertures made as aforesaid are filled with tough leather or similar substance, packed in very firmly.

When the nut 7 is turned up quite tight on the spindle 6, or other part designed to receive the nut, and the holes are brought into proper registering position a screw 9 with a sharp thread and preferably though not necessarily provided with a sharp gunlet point 10, is turned into the said leather in said holes in a line transversely to the axis of the spindle, bolt, or other instrumentality on which the nut 7 is turned. By this means the nut will be securely held against turning back or becoming loose not only by the screw but by what may be mentioned as the surplus leather crowding and choking the screw threads in proximity to the operation.

Should it be desired to remove the locked nut, this can be done by turning out the locking screw 9 with a screw-driver when the nut can be turned off with a wrench or spanner.

I am aware that in door-spindles, and some other devices, it has been proposed to turn a screw into a screw-threaded hole formed transversely through a knot or member and spindle, but I do not know of leather or similar substance having been combined therewith as proposed by me in my invention.

The hole made through the spindle or cognate device may be oblong as well as round. In the former instance, it will allow adjustment, that is, the nut may be turned up further in the former than in the latter case, and yet leave room for the shank of the screw. In the latter example there will be but one point at which the leather-filled holes will be brought into registering position.

Other variations may be made in the form and arrangement of parts within the scope of mechanical skill without departing from the general nature or spirit of the invention.

What is claimed is:

1. In a nut lock, an externally screw-threaded part or member, and a nut adapted to be turned thereon, the said part or member and nut having holes formed transversely therethrough, tough fibrous material filling said holes, combined with a sharp threaded screw turned into said leather through the said holes.

2. In a nut lock, an externally screw-threaded part or member, and a nut adapted to be turned thereon, the said part or member and nut having holes formed transversely therethrough, the hole formed through the first-mentioned part or member being oblong in form, tough fibrous material filling said holes, combined with a sharp threaded screw turned into said fibrous material and through the said holes.

3. The combination with two members fitted one within the other, the inner member having a recess extending therethrough adjacent to the outer member, of a fibrous material filling in said recess, and a screw passed through the outer member and engaged in the fibrous material filling, whereby the two members are held against disconnection.

In testimony whereof, I affix my signature, in presence of two witnesses.

GEORGE W. STUART.

Witnesses:
A. T. NETTLETON,
B. H. BEERS.